June 20, 1967 J. A. MARQUIS 3,327,197
MOTOR STARTING DEVICE INCLUDING A SURGE
LIMITER AND CUTOUT MEANS
Filed Sept. 30, 1964 3 Sheets-Sheet 1

INVENTOR.
JAMES A. MARQUIS
BY
ATTORNEYS

United States Patent Office 3,327,197
Patented June 20, 1967

3,327,197
MOTOR STARTING DEVICE INCLUDING A SURGE LIMITER AND CUTOUT MEANS
James A. Marquis, Danbury, Conn., assignor to Barlow Controls, Inc., Stamford, Conn., a corporation of New York
Filed Sept. 30, 1964, Ser. No. 400,511
7 Claims. (Cl. 318—430)

This invention relates to a motor starting device. More particularly, my invention pertains to a motor starting device that is designed to protect a power line and motor from the imposition of unduly high current during the starting or attempted starting of an electric utility motor (a motor that drives a utility).

One of the problems arising in connection with the starting of an electric utility motor is that when current first is supplied to the motor, with the motor still at standstill, the resistance of the wire windings is very low and permits the flow of a large surge current which only subsequently is reduced as the motor builds up speed and generates a counterelectromotive force. It has been proposed to overcome this problem by including in a leg of the power line that supplies the motor a so-called "surge limiter" which constitutes a series connected resistor of sufficiently high value to limit the initial flow of current to an acceptable level that is neither too high to be harmful to a power line nor too small to start the motor. After a suitable time lapse the resistance of the surge limiting resistor either is reduced to a very low value or said resistor is shunted out, so that substantially the full line potential thereupon is applied to the motor which now presumably is rotating at its rated speed. A particularly apt surge limiting resistor is one having a negative coefficient of resistance which resistor when at room temperature offers a resistance value large enough to limit current flow to an acceptable value for the power line and the motor and which when the motor reaches running speed offers, by virtue of its increased temperature, a very low value of resistance and either may be left in the line or shunted out. Such a surge limiting resistor is shown in application Ser. No. 308,553, filed Sept. 12, 1963, by Robert W. Dresser, and assigned to the assignee of the present application.

However, the initial heavy flow of surge current is only one of the power line and motor protection problems encountered in the starting of electric motors, and particularly of electric motors which are mechanically coupled to a utility, such, for instance, as an air conditioner compressor pump. The compressor pump after a short period of operation builds up a high pressure for the refrigerant, this pressure conventionally being bled through an expansion valve. When the compressor is shut down after normal operation, the high pressure persists for several minutes. If an attempt is made to start the motor while the pressure still is too high, the load is so great that the motor simply will not start. Hence, if, after operation, such a motor is turned off and then within too short a period of time turned back on again, the motor has to start up under a heavy load that is in excess of the starting capacity of the motor. Such condition is referred to in the industry as "locked rotor". When an electric utility motor is in a locked rotor condition and an attempt is made to start it, it will draw a high surge current until the load condition is alleviated or the line fuse has blown out because no counter electromotive force is built up. A thermal cut-out which may be associated with the motor eventually would be operated because the rising temperature of the motor windings would actuate the same, but this is a comparatively slow operating cutout, taking several seconds to function and throughout that entire period allowing a large locked rotor current to be imposed on the power line and the motor to the detriment thereof. If the line fuse blows, there will be a prolonged shut-down until the fuse is replaced.

Electric companies have set up certain standards relating to motors that may be connected to their lines. Among these standards is the requirement that a motor may not draw too high a locked rotor current. Behind this is the concept of protecting wiring and motors against thermal deterioration as a result of supplying locked rotor current for a time long enough to allow the line and motors to overheat. For example, electric companies typically will not permit a motor to be connected to a 15 ampere line if the motor draws a locked rotor current of over 50 amperes. The locked rotor current is an approximate function of the rated running current. Thus, an accepted rule of thumb for a normal 12 ampere air conditioner having an 8 ampere compressor and a 2 ampere fan is that the locked rotor current is 6 times the rated running current for the compressor (which is the motor that can be locked) or 6×8, i.e., 48 amperes.

This, therefore, limits the rated running current, and hence the horsepower, of a motor which can be used on a line by restricting the permissible locked rotor current of the motor and forces the utilization on low rated power lines of motors of relatively low horsepower for air conditioners and other utilities so constructed that the motor may be subjected to a locked rotor condition. It would be extremely desirable to use motors of greater power outputs the current demands of which still are within the parameters of the line set by the electric companies so far as rated running currents are concerned because this would permit heavier duty motors and utilities to be employed in general. But the drawback until the present invention has been the restriction related to locked rotor current. The surge current limiter, although of great value in that it restrains the initial surge current and therefore should permit the use of a motor of larger horsepower on a given power line, has not been able to overcome the problem of locked rotor current.

It is an object of my invention to provide a motor starting device which will permit the use of motors of greater power than presently are allowed by the electric companies on power lines.

It is another object of my invention to provide a motor starting device which will protect a motor from prolonged excessive currents.

It is another object of my invention to provide a motor starting device which, due to fast action of the device, will prevent fuses from blowing and thus avoid prolonged shut-downs.

It is another object of my invention to provide a motor starting device which will decrease the inductive spike of a motor winding to a negligible amplitude.

More specifically, it is an object of my invention to provide a motor starting device of the character described which includes both means to limit to an acceptable value the starting surge current, and means to disconnect (cutout) the motor from the line with great rapidity when a locked rotor condition is encountered, so that under no circumstances will the line or motors be subjected to the drawing of an excessive current for a time long enough to harm the same. In this fashion, by protecting the line and motors against surge current and against locked rotor current, the use of motors of larger horsepower may be permitted by the electric companies, providing, of course, that the rated running current of the motor does not exceed the current rating for the line.

It is another object of my invention to provide a motor starting device of the character described which is compact, inexpensive, simple, efficient, durable and foolproof.

It is another object of my invention to provide a motor starting device of the character described which can be readily incorporated into existing installations and into existing motor driven utilities, such, for instance, as air conditioners.

It is another object of my invention to provide a motor starting device of the character described in which the surge current limiter does not detrimentally affect the operation of the locked rotor cutout and in which the locked rotor cutout does not detrimentally affect the operation of the surge current limiter, that is to say, in which these two components of the device function compatibly and toward the common end of protecting the line against an unduly heavy flow of starting current, regardless of its cause.

It is another object of my invention to provide a motor starting device of the character described which is effective to inhibit an extended imposition of a locked rotor current on a power line or motor, regardless of the posture of the surge current limiter. The surge current limiter has two postures. The first is what might be termed the "cold" or "idle posture which is the mode that prevails when a fresh starting attempt is made after a sufficiently long period of motor idleness. At this time the full value of the resistance of the surge limiting resistor is in the line and affords protection against locked rotor current. The second posture, which may be referred to as the "running" posture of the surge limiter, prevails after a period of time that is sufficiently long to bring the motor up to speed under ordinary and proper circumstances. In its running posture the surge current limiter resistor either has a very low order of resistance or is shunted out and such posture will be maintained even after the motor is stopped and immediately thereafter restarted. At this time, due to the low resistance value of the surge current limiting resistor and if the motor is connected to a full capcacity load, a locked rotor current will immediately start to flow. Pursuant to this last object of my invention, my motor starting device will prevent a temporally extended condition of locked rotor current, regardless of whether the surge current limiting resistor is in either its idle or its running mode.

It is another object of my invention to provide a motor starting device of the character described which will protect an electric line and motors against the application of a locked rotor current even if the motor should be mechanically blocked in some fashion, for example, due to bearing seizure or to mechanical breakdown of a utility to which the motor is directly coupled.

It is an ancillary object of my invention to provide a motor starting device of the character described which will protect an electric line and motors against a protracted overload of lesser value than a locked rotor overload.

Other objects of my invention in part will be obvious and in part will be pointed out hereinafter.

My invention accordingly consists in the features of construction, combinations of elements and arrangements of parts which will be exemplified in the motor starting device hereinafter described and of which the scope of application will be indicated in the appended claims.

In the accompanying drawings in which are shown various possible embodiments of my invention, FIG. 1 illustrates the electric circuit of an electric motor starting device embodying my invention, the same including a manually resettable electromagnetic holding means;

Figure 1:
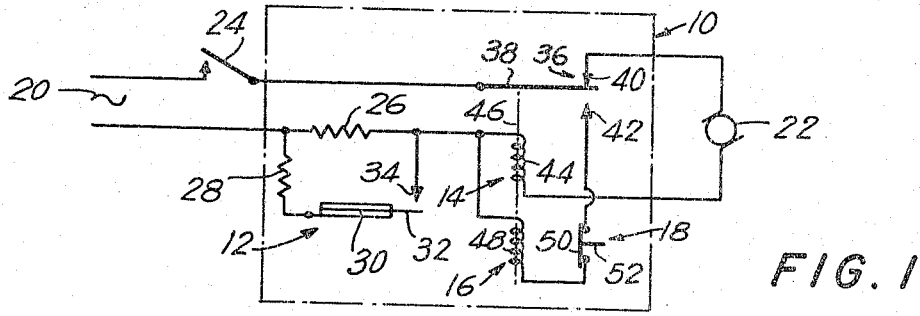
Figure 5:
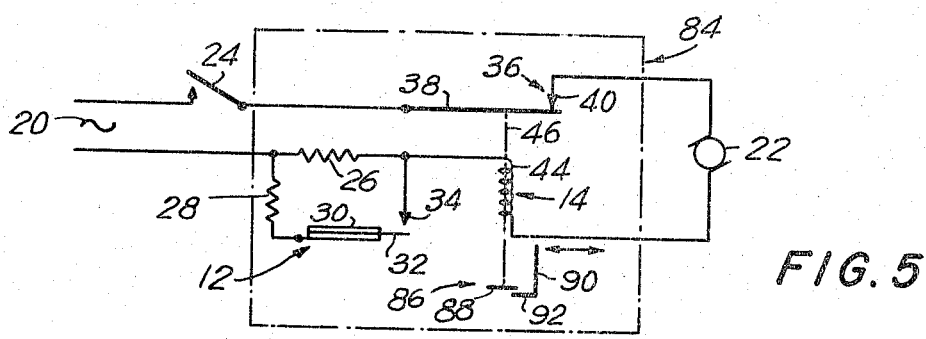
Figure 6:
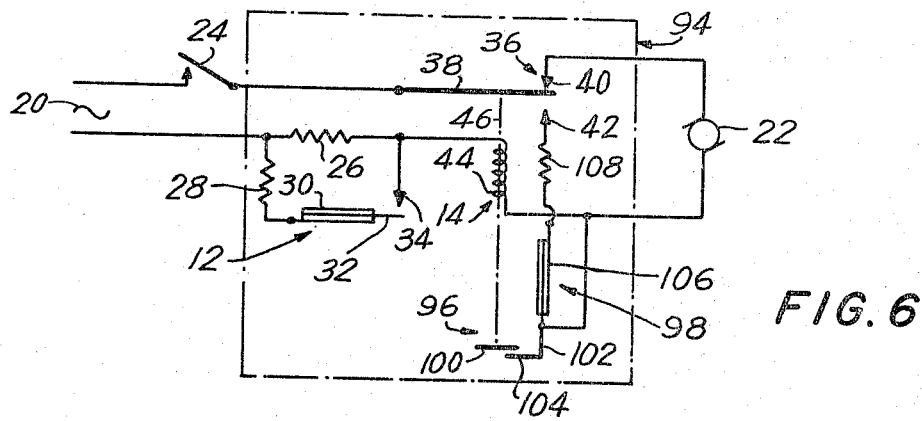
Figure 7:
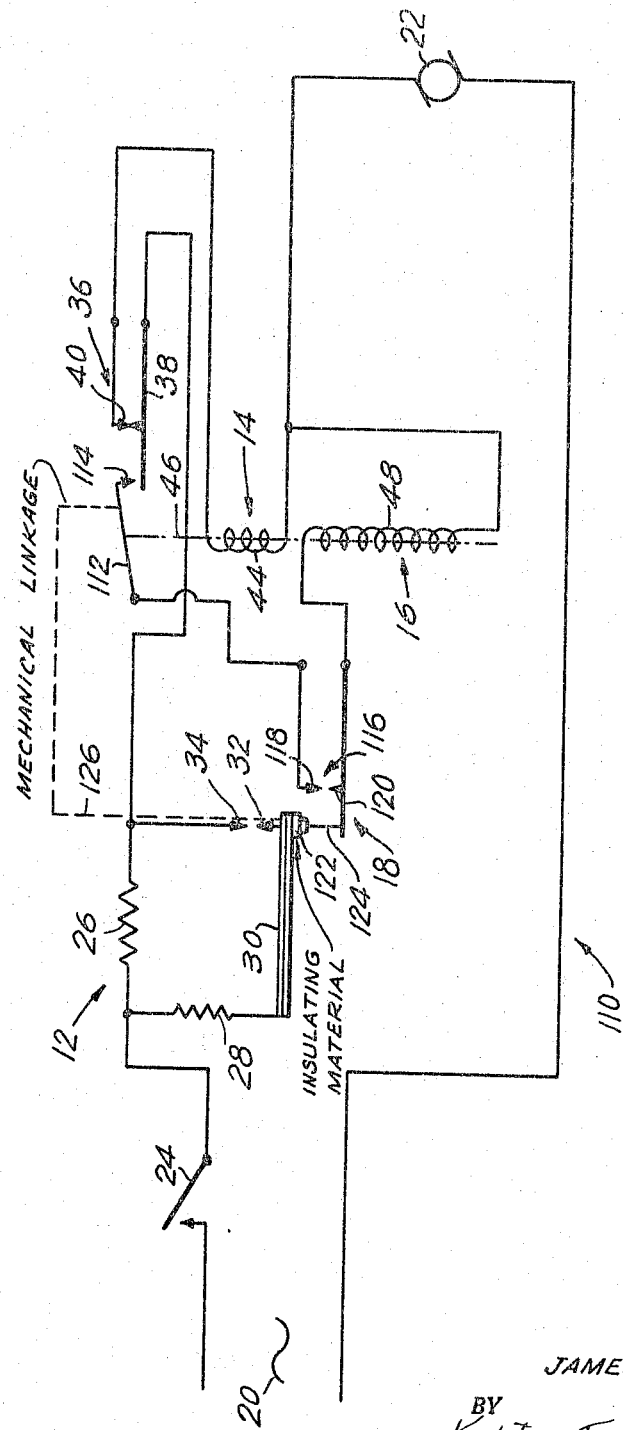

FIGS. 5 and 6 are views similar to FIG. 1, but illustrating two different types of mechanical holding means, the first (FIG. 5) being manually resettable, and the second (FIG. 6) being automatically resettable; and FIG. 7 is a view similar to FIG. 1 of a sophisticated and preferred form of electric motor starting device embodying my invention, the holding means being electromagnetic and automatically resettable, and there also being associated with said device an arrangement for cutting out the motor in the event of a protracted overload of a value less than locked rotor current and an arrangement for cutting out the motor in the event of a locked rotor condition occurring when the surge limiter is in its idle mode.

Basically, my invention is carried out by providing the combination of (1) a surge limiter series connected between a motor and a power line; (2) a locked rotor current electromagnetic sensing and motor cut-out means (e.g., a coil and a switch controlled by the coil) likewise series connected between the power line and the motor and therefore in series with the surge limiter; and (3) a holding means which functions to maintain the motor cut-out means effective when the locked rotor current sensing and cut-out means has been actuated. Said holding means has associated with it a resetting means, whereby after a period of time subsequent to actuation of the holding means the holding means may be manually or automatically rendered ineffective, so that a fresh attempt at starting can or will be made.

The holding means can either be mechanical or electromagnetic. For example, the holding means may constitute a second electromagnetic coil or it may simply constitute a mechanical latch. The resetting means will interrupt the circuit to the holding coil, if such is used, or will mechanically shift the latch to idle position in the second case. In a particularly simplified form of my invention the resetting means merely comprises a normally closed momentary switch in the circuit for the holding coil, whereby it is only necessary to open the switch by hand when the holding coil is to be reset. Alternatively, the resetting means may be operated by a timer, such, for instance, as a resistor the resistance value of which varies over a period of time with the generation of heat therein, or a bimetallic strip which is caused to experience a mechanical deflection over a period of time due to the application of heat thereto. Desirably, there also is built into my novel motor starting device a component for opening the circuit to the motor should the current flowing through the device be excessive for a protracted period of time, although not sufficiently great to actuate the locked rotor current sensing coil. Finally, it is desirable to include a provision for enabling the motor to be cut out even when a locked current condition occurs in the rare case where an attempt is made to start a motor after the lapse of a period of time which is sufficiently long to ensure that the surge limiter is in its cold mode. Thereby, my unique motor starting device will protect the line against an extended heavy flow of current for any period of time that is long enough to heat the line to an unacceptable temperature. With these safety provisions present the electric power companies now can permit the use on a line of a motor having a higher rated running current than they have heretofore and hence utilities with heavier duty motors can be used in homes, in apartment houses, in factories and in office buildings without the necessity of rewiring for accommodation of the same.

Figure 2:
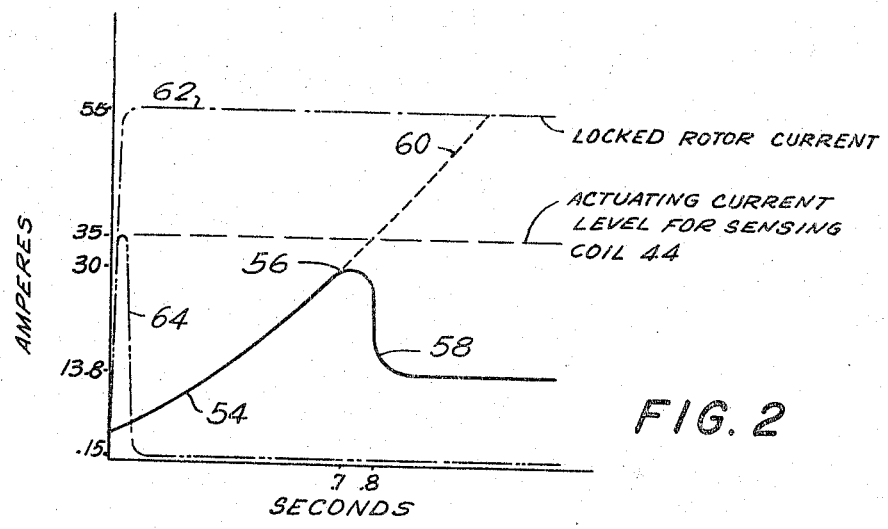
FIG. 2 is a current-time graph illustrating the operation of an electric motor starting device embodying my invention.

Referring now in detail to the drawings and more particularly to FIGS. 1 and 2, the reference numeral 10 denotes a starting device constructed in accordance with and embodying my present invention. The particular starting device illustrated in this figure is in an extremely simple form without many of the sophisticated improvements which will be illustrated and described in connection with a preferred form of my invention subsequently detailed. However, this starting device 10 has been shown and now will be described in order to provide an appreciation of the basic functions of the device.

The starting device 10 includes a surge limiter 12, a locked rotor current electromagnetic sensing and motor cutout means 14, a holding means 16 for the cutout means, and a resetting means 18 for the holding means. The device 10 is inserted between a power line 20 and an electric motor 22. The power line may be provided with the usual switch 24. The motor is of any conventional type.

As indicated earlier, the surge limiter may be of any construction which provides a resistance in series with the motor at the time a starting effort first is made, the resistance being sufficiently high to prevent a surge current from being drawn through the power line and overheating the same. The resistance also should permit enough current to flow through the motor to start the motor up, this being referred to hereinafter as the "rated starting current." The resistor may be one with a small temperature coefficient of resistance, that is to say, one in which the change of resistance with a change in temperature is not great enough to noticeably affect the operation of the motor or of the circuit. Where such a resistor is employed the surge limiter also includes a delayed action shunting path around the resistor which becomes effective after a period of time sufficiently great for the motor to start, for example, two seconds.

Alternatively, the surge limiter may include a resistor having a substantial negative temperature coefficient of resistance. Such a resistor when cold has a resistance value sufficiently great to prevent the flow of a detrimental surge current through the power line. However, the resistor quickly warms up and as it does so, its resistance value drops appreciably and quickly to a point where it passes a current large enough to start the motor. As the motor starts, a counter electromotive force is built up to limit the flow of current through the motor and as the motor comes up to speed the resistance value of the current limiting resistor drops to a very small amount which does not affect the operation of the motor by virtue of a voltage drop across the same. Moreover, and preferably, this latter type of surge limiter also includes a shorting path which is operable to shunt out the resistor after the motor has had sufficient time to start. This shorting path need not become effective as quickly as the shorting path for a substantially constant-value resistor inasmuch as the negative temperature coefficient resistor even before the shorting path becomes effective, has a voltage drop value which is so low that the motor is able to generate almost its full rated mechanical output. However, it is preferred to include the shorting path even for such a resistor so as to minimize unnecessary voltage drops to the motor and power losses in the starting equipment.

The specific surge limiter 12 illustrated in FIG. 1 includes a current limiting resistor 26 having a negative coefficient of resistance of appreciable value. In order to aid in the explanation of my invention, I will give electrical values of various components which are suitable for use with a motor combination (compressor and fans) such as is used in a typical air conditioner that draws a running rated current of 13.8 amperes. This type of motor combination typically has a locked rotor current of 55 amperes which makes it too large to be used on a 15 ampere, 110 volt line. The typical minimum starting current for the motor combination is about 30 amperes. Such a starting current is permitted on a 15 ampere line, providing, of course, that it is not unduly extended, in other words, if the line is only subjected to such current for a period permitted by the time constant of the line fuse. In order to suitably limit the surge current which initially would flow through the motor windings and would have a value in the vicinity of the locked rotor current of 55 amperes the resistor 26 has a resistance value of approximately 12 ohms at room temperature, i.e., about 25° C. The negative temperature coefficient of resistance is such that at about 125° C. the resistor will have a resistance value of approximately 0.2 ohm.

The surge limiting means 12 further includes a shunt path for the resistor 26. The shunt path constitutes a bimetallic strip 30 carrying a contact 32 which cooperates with a stationary contact 34. The resistance value of said strip is symbolized by the resistor 28. The contacts 32, 34 are open at room temperature. The resistor 26 is in heat conductive relationship with the bimetallic strip 30 and the bimetallic strip is so arranged that upon heating it will flex to close the contact 32 against the contact 34.

The resistor 26 is of a non-linear type and preferably constitutes a non-linear resistor of the kind commercially known as a "thermistor." Typical thermistors are made by the General Electric Company of Edmore, Mich. By way of example, I may use a stack of three No. 3W752 General Electric thermistors. Each of these has an individual resistance value of 4.15 ohms at room temperature, so that the three altogether have a total resistance of 12.45 ohms. Where such a series of thermistors is employed in a line running to a 13.8 ampere motor combination, the internal heat generated in the thermistors during starting will lower the resistance of the thermistors in about 0.5 to 1.2 seconds (varying because of the diverse characteristics of different motors) to a point at which the motors are running at rated speed and the voltage drop within the thermistors is so small as to be negligible.

The bimetallic strip 30 is so proportioned and arranged in such heat conductive relationship with the resistor 26 that the contacts 32, 34 will close in approximately 15 seconds, this figure not being critical. The bimetallic strip has a resistance value of about 0.05 to 0.1 ohm.

The locked rotor current electromagnetic sensing and cutout means 14 includes a single-pole double-throw switch 36 having a movable blade 38 connected in the line to the motor combination. Said blade is normally closed against a first stationary contact 40 and is spaced from a second stationary contact 42. The electromagnetic means additionally includes an actuating electromagnetic coil 44 having one terminal connected to the surge limiter 12 and the other terminal connected to a terminal of the motor 22. Hence, it will be seen that during starting and ordinary running of the motor 22 the electromagnetic coil 44 is in series with the motor, the blade 38 and the contact 40, so that the full current passing through the motor also circulates through the sensing coil 44.

The coil 44 has an armature 46 which is mechanically connected to the movable blade 38. Said coil 44 is so designed that when a current passes therethrough which is in excess of the rated starting current (in this instance, 30 amperes) for the motor 22 to which the electric motor starting device is adapted to be connected, it will shift the contact blade 38 away from the first stationary contact 40 and into engagement with the second stationary contact 42. For example, the coil 44 in a typical embodiment of my invention is designed to move the blade from the first to the second contact at a motor current of 35 amperes. Moreover, said coil is so designed that the current at which it will actuate the movable blade 38 to engage the contact 42 is less than the locked rotor current for said motor which, it will be recalled, is, in the given example, 55 amperes. Thus, the coil 44 is designed to operate the motor cutout and close the circuit for the holding means upon the flow of a current through the power line between the rated minimum starting current for the motor and the locked rotor current for the motor. Desirably, the coil is designed to operate closer to the minimum rated starting current than to the locked rotor current and as shown here in a typical example will operate at 5 amperes above the minimum rated starting current. Thereby, the coil 44 will immediately sense the presence of locked rotor current and will by moving the blade 38 away from the contact 40 open the low resistance circuit for the motor 22. It may be mentioned at this point that because the coil 44 remains in series with the motor during normal operation of the running thereof, it must have a low resistance, such resistance in a typical example of my invention being in the order of 0.01 ohm.

In the operation of my motor starting device 10 including only the components as thus far described, let it be assumed that the motor 22 is to be started and that it has not been running for some time, so that the thermistor 26 is at room temperature. At this time the blade 36 will be in its normally closed position against the first stationary contact 40, being urged there by a suitable biasing means such as a spring (not shown). The switch 24 which was open is closed to start the motor. Current immediately flows into the motor from the switch 24 through the blade 38 and the first stationary contact 40, returning to the other leg of the power line through the thermistor 26. The current also traverses the electromagnetic coil 44 which is operatively connected to the movable blade 38.

An initial high surge of current ordinarily associated with the starting of the motor will not take place because of the high resistance offered by the thermistor 26. Indeed, the resistance is so great at the instant of closure of the switch 24 as to restrain the current flowing through the motor to a value below the rated starting current, so that the motor is unable to start. However, the passage of current through the thermistor generates internal heat and quickly raises the temperature of the thermistor. As its temperature raises the flow of current through it and through the motor quickly mounts until at approximately 0.4 to 1.1 seconds after closing the switch 24 the level of current flow is sufficiently high to start the motor, that is to say, a rated starting current flows. As soon as the rated starting current level is attained the motor will start to rotate and will generate a counter electromotive force which quickly reduces the level of the current flowing through the motor and through the starting device. In about 0.5 to 1.2 seconds after closing the switch 24 the motor has approximately reached its running speed and will be drawing only its rated running current, in this instance about 13.8 amperes. At about 0.4 to 1.1 seconds after closing the switch 24 the temperature of the thermistor has bceome sufficiently high and its resistance sufficiently low to permit the flow therethrough of the rated starting current of about 30 amperes, and the temperature continues to rise and the resistance value of the thermistor to drop as the motor comes up to rated running speed.

As the thermistor heats up, a heat transfer takes place from it to the bimetallic strip 30 and ultimately at a time after the motor is started the contact 32 engages the contact 34. As mentioned previously, in a typical surge limiter embodying my invention this will take place about 15 seconds after the switch 24 is closed. If desired, the design may be rearranged to effect a more rapid closure of the contacts 32, 34, but the same is not necessary. It will, of course, be appreciated that these contacts should not be closed until after the motor has started, in this instance at least after 1.2 seconds following closure of the switch 24.

What I have described above is a normal starting cycle for an unloaded motor. Such operation will take place in an air conditioner, for example, if the back pressure on the compressor pump has been permitted to bleed off. However, if the motor has been running for a time long enough to build up a normal operating back pressure in the compressor pump, is then turned off and subsequently is restarted while an appreciable back pressure prevails, the motor will not be able to start because it will be overloaded. But if the shunting contacts 32, 34 are closed and/or the thermistor 26 is at its running temperature whereat its resistance is so low as to be negligible, a locked rotor current will be drawn from the power line and will pass through the motor since there will be no counter electromotive force generated by the motor. This current passes through the sensing and motor cutout means 14 and specifically through the electromagnetic coil 44 connected in series with the motor. The coil, as noted above, is so constructed that a current of locked rotor magnitude (in excess of the rated starting current) passing therethrough will pull down the blade 38, shifting it away from its normally closed position in engagement with the motor contact 40 so as to open the motor circuit. This action is very rapid. The coil 44 may be energized in approximately one-quarter cycle, i.e., one-half of either half cycle, or within a few half cycles, so as to render the motor cutout 14 effective. Hence, almost immediately upon the occurrence of a flow of locked rotor current the motor is cutout and such heavy current no longer will be drawn from the power line.

It will be apparent that upon shifting the blade 38 away from the motor contact 40, the energizing circuit for the electromagnetic sensing coil 44 also is broken and this would allow the blade 38 to be reclosed against the contact 40 by the switch biasing spring. Such reclosure is prevented by actuation of the holding means 16. Said holding means comprises a holding electromagnetic coil 48 arranged to actuate the same armature 46 as the coil 44. The coil 48 has one terminal connected to the contact 42 and the other terminal connected to the surge limiter 12. Thus, when the blade 38 swings away from the contact 40 and engages the contact 42 it completes an energizing circuit for the holding coil 48 and impresses line voltage across this coil. The resistance of the coil is sufficiently high to prevent the flow of more than a low value of current therethrough. For example, the resistance of said coil may be in the order of 800 ohms. Thus, actuation of the holding electromagnetic coil 48 will maintain the blade 38 closed against the holding contact 42 and will maintain open the energizing circuit for the motor. If nothing further is done, the motor will remain cut out until the switch 24 is opened to de-energize the coil 48 and then reclosed to make a fresh motor starting attempt.

It is highly preferable to include in the device 10 the resetting means 18 for rendering the holding means 16 ineffective and thus resetting the sensing and cutout means 14 to compete the energizing circuit for the motor when another motor starting cycle is to be initiated. As shown in FIG. 1, the resetting means 18 is in the form of a normally closed momentary switch 50 connected in series in the energizing circuit for the holding coil 48. The switch has an operating member 52, e.g., a button, adapted to be engaged by hand and which, when pressed, will open the energizing circuit for the holding coil 48. This in turn will permit the blade 38 to be reclosed by the switch biasing spring against the motor contact 40 to once again try to start the motor. Presumably, the holding means will be operated by a person after the compressor load has been bled down sufficiently to start the motor. If the resetting switch is operated sooner, the cut-out cycle merely will be repeated.

It will be observed that if a starting attempt is made after the thermistor 26 and bimetallic strip 30 have cooled sufficiently to permit the shunting contacts 32, 34 to open and the thermistor to assume its high resistance state, the initial flow of current through the thermistor will be restrained by the voltage drop across the thermistor so that a current in excess of rated starting current will not be applied to the cutout coil 44 for energization thereof. At such time, therefore, current will flow through the thermistor for a sufficient period of time to substantially lower the thermistor resistance and/or to reclose the contacts 32, 34 providing, of course, that the locked rotor condition persists. Thereupon, substantially the full locked rotor current will flow through the sensing coil 44 to open the motor cutout switch 36 which will be maintained open by the holding coil 48.

In FIG. 2 I have shown a graph demonstrating the operation of the device 10. The solid line curve illustrates the current-time relationship for a motor start in which there is no locked rotor condition. The initial portion 54 of the curve illustrates the current-time relationship before the motor starts and while the temperature of the thermistor rises as its resistance decreases. At the point 56 the motor starts to turn and to build up a back electromotive force. Hence, the current will rise more slowly with time and then as the motor reaches full rated speed at the point 58 the current will drop to the rated running value for the motor.

If the motor is in locked rotor condition, the current-temperature curve will leave the solid curve at the point 56 and will continue as indicated by the dotted line 60 until a value is reached at which the sensing coil 44 is energized to cut out the motor. At such time the current will drop to the level permitted by the impedance value of the holding coil 48.

Also in FIG. 2 I have shown by a dot-and-dash line 62 the current-time relationship when an attempt is made to start the motor under locked rotor conditions. It will be observed that the current quickly builds up to a high plateau the value of which is the locked rotor current. Finally, shown in FIG. 2 by a double dot-and-dash line is a curve 64 illustrating the current-time relationship where an effort is made to start the motor under locked rotor conditions and when the surge current limiter is effective, i.e., the contacts 32, 34 are closed and/or the thermistor is in its low resistance state. Because the surge limiter 12 offers a negligible resistance to the locked rotor current, said current will quickly build up toward its peak value. However, as soon as it reaches a level sufficiently high to actuate the coil 44, this coil will open the motor cutout switch 36, thereby immediately dropping the flow of line current to the low level which is maintained by the holding coil 48. The coil 44, because it is electromagnetic in nature, will operate with extreme rapidity either in the first half cycle of locked rotor current flow or during the next two or three half cycles, such time being too short to be seen in FIG. 2, where it has been exaggerated for the purpose of illustration. Thereby, neither the power line nor the motor is subjected to the locked rotor current for a time sufficiently long to harm either one of them.

Figure 3:
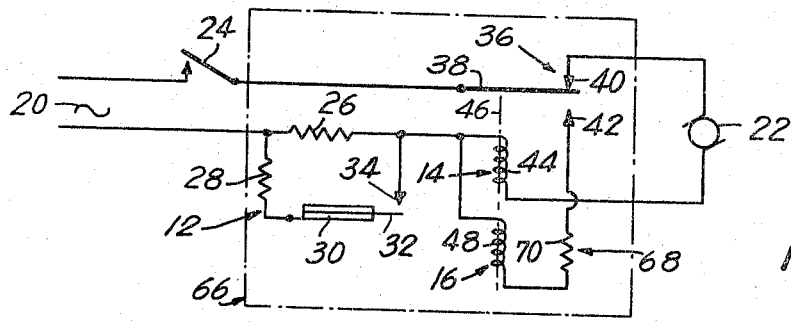
FIG. 3 is a view similar to FIG. 1, but illustrating a modified form of electric motor starting device embodying my invention wherein a first type of automatically resettable electromagnetic holding means is utilized.

In FIG. 3 I have shown a starting device 66 which is identical to the starting device 10, except for the resetting means. To simplify description of the device 66, all of the parts which are identical to those shown in and described with respect to FIG. 1 are denoted by the same reference numerals and will not be redescribed. In FIG. 1 the resetting means 18 is in the form of a normally closed momentary switch 50 which has to be actuated by hand or by some other form of physical force. The device of FIG. 3 has a resetting means 68 which will operate automatically.

More specifically, the resetting means 68 of the device 66 is in the form of a resistor 70 series connected in the energizing circuit for the holding coil 48. The resistor 70 takes the place of the normally closed momentary switch 50. Said resistor 70 has a positive temperature coefficient of resistance. When cold, i.e., at room temperature, the value of the resistor 70 is sufficiently low to allow enough current to flow through the holding coil 48 to maintain the blade 38 closed against the contact 42. As soon as the holding coil 48 is energized, current will flow through the resistor 70 and gradually raise its temperature. After a certain span of time said resistor is designed to reach a temperature at which its resistance is sufficiently high to prevent the current flowing through the holding coil 48 from maintaining the blade 38 engaged with the contact 42 against the restoring (biasing) spring for the switch 36. As soon as this heightened value for resistance is reached, the blade 38 will be reset, i.e., will close against the contact 40.

A suitable span of time for recycling the switch 36 to close against the motor contact 40 is about two minutes. It will be understood, however, that this time can be varied to accommodate the parameters of any particular utility. Thus, if a shorter time is required, the physical make-up of the resistor 70 will be altered to increase its temperature upon heating, or a resistor will be employed having a larger temperature coefficient of resistance.

Figure 4:
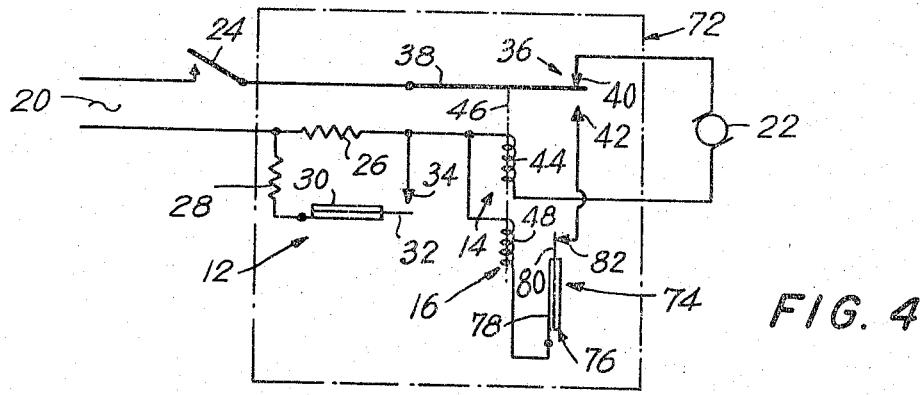
FIG. 4 is a view similar to FIG. 3, but showing a second type of automatically resettable electromagnetic holding means.

In FIG. 4 I have shown another electric motor starting device 72 which likewise is similar to the device 10 shown in FIG. 1, except for the resetting means and in which the same parts have been denoted by the same numerals. Said device 72 has a resetting means 74 which, like the resetting means 68 of FIG. 3, is automatic in nature. It constitutes a bimetallic switch 76 which is normally closed and which is connected in series in the energizing circuit for the holding coil 48. Said switch comprises a bimetallic strip 78 carrying a contact 80 which when the strip is cold is engaged with a stationary contact 82. Hence, as long as the bimetallic switch is at room temperature, i.e., cold, the energizing circuit for the holding coil 48 will be completed while the blade 38 engages the contact 42. Flow of current through the holding coil 48 passes through the bimetallic strip 78 which, because of its resistance, will heat up. Within a certain period of time the bimetallic strip heats sufficiently to flex and swing the contact 80 out of engagement with the contact 82. Thus, the energizing circuit for the holding coil 48 will automatically be opened after a predetermined period of time, so that the motor cutout 48 will be de-energized, the motor circuit consequently reclosed and a fresh attempt automatically made to restart the motor.

In the foregoing FIGS. 1, 3 and 4, I have shown an electromagnetic holding means 48 with either a manual or an automatic resetting means. It also is within the scope of my invention to employ other types of holding means, for example, mechanical holding means, and these have been illustrated in FIGS. 5 and 6. In FIG. 5 the reference numeral 84 denotes an electric motor starting device which is like the device 10, except for the holding means and resetting means. All of the components of said device 84 which are the same as those of the device 10 are denoted by the same reference numerals.

Instead of using an electromagnetic coil operating on the same armature 46 as that operated upon by the sensing and cutout coil 44, I employ a mechanical holding latch 86 in said device 84. Said latch 86 comprises a dog 88 secured to the armature 46 and therefore movable therewith. The latch further includes a pawl 90, made, for example, of flat spring stock, and provided with a toe 92. The toe is in the downward path of travel of the dog 88 when the cutout coil 44 is energized to swing the blade 38 away from the motor contact 40. Thereby, after the blade 38 is disconnected from said motor contact, the armature 46 will be held in its contact-open position by abutment of the upper face of the dog 88, against the toe 92 under the influence of the biasing spring for the switch 36, said dog having brushed by and past the toe on the downward movement of the armature 46. Thus, the motor circuit will remain open and no current at all will flow through the power line.

When it is desired to reset the electromagnetic locked rotor current sensing and cutout means 14, the pawl 90 is shifted to the right, the same either including a sliding mounting or being arranged to be swung to an out of the way position by flexing the same. In either event the toe 92 unblocks the dog 88 and permits the blade 38 to reclose against the motor contact 40 under the influence of the restoring spring for the switch 36. This resetting means obviously can be operated by hand or by any other mechanical force applying means and therefore is not inherently automatic in nature.

FIG. 6 illustrates an electric motor starting device 94 which, like the device 84, employs a mechanical holding means, i.e., a latch, 96. However, unlike the device 84, the device 94 employs an automatic resetting means 98.

Specifically, the latch 96 comprises a dog 100 secured to the armature 46 and movable therewith. The latch further includes a pawl 102 made, for example, of flat spring stock and provided with a toe 104. The toe is in the downward path of travel of the dog 100 when the cutout coil 44 is energized to swing the blade 38 away from the motor contact 40. Thereby, after the blade 38 is disengaged from said motor contact, the armature 46 will be held in its contact-open position by abutment of the upper face of the dog 100 against the toe 104 under the influence of the biasing spring for the switch 36, said dog having brushed by and past the toe on the downward movement of the armature 46. Thus, the motor circuit will remain open and no current whatsoever will flow through the power line.

The resetting means 98 for automatically recycling the holding means, so as to close the cutout switch 36 and initiate a fresh start after a predetermined period of time, constitutes a bimetallic strip 106 which supports the pawl 102. When the strip is heated, it flexes the toe 104 in a direction away from its locking position above the dog 100. Said bimetallic strip is connected in series between the contact 42 and the power line, so that when the sensing coil 44 actuates the switch 36 to cut out and hold out the motor contact 40, the blade 38 will direct current through the bimetallic strip 106 to heat the same by virtue of its innate resistance or that of a resistor 108 in its energizing circuit, so that the strip will slowly heat up and at the end of a predetermined period of time, for example, two minutes, flex the toe 104 out from above the dog 100 so as to release the armature 46 and allow the normally closed cutout switch to reclose against the contact 40.

In FIG. 7 I have shown yet another electric motor starting device 110 embodying my invention. Said device 110 employs an electromagnetic holding means and an automatic resetting means controlled by a temperature-responsive element, and therefore, in a broad sense, is similar to the device 72 described with respect to FIG. 4. However, the device 110 embodies various additional refinements which make it the presently preferred form of my invention. Thus, the device 110 includes an arrangement for operating the motor cutout switch 36 in the event a low order of overload current persists for an extended period of time, such overload current being less than that which would operate the locked rotor current sensing means 14. The device 110 further includes an arrangement for ensuring that the energizing circuit for the electromagnetic holding means is open at any time that the energizing circuit for the electromagnetic locked rotor current sensing means is energized to its actuation state, whereby all the magnetic flux generated by the electromagnetic sensing means will be available to sense the presence of a locked rotor current and operate the cutout switch 36, regardless of whether the device is in its idle or running posture. In this connection it will be observed that should the electromagnetic sensing means for locked rotor current be energized to its actuation state while the electromagnetic holding means has its energizing circuit completed, a part of the flux generated in the sensing means would be diverted to generate current in the electromagnetic holding means which is magnetically coupled to the sensing means by the armature 46. Hence, the sensing means would respond differently, depending upon whether or not the energizing circuit for the holding means is open or closed, for example, closed when the device 110 is in running posture and open when said device is in idle posture.

Referring specifically to FIG. 7, all components which are similar to those of FIG. 1 have been indicated by the same reference numerals. Said device includes a surge limiter 12, a locked rotor current sensing electromagnetic means and cutout 14 in the form of a coil 44, and switch 36 operated thereby, an electromagnetic holding means 16 in the form of a coil 48 and a resetting means 18.

The surge limiter 12 constitutes a thermistor 26 series connected in the power line leading to the motor 20 from the control switch 24. Said thermistor is shunted by a low value resistor 28 and a bimetallic strip 30 carrying a contact 32 spaced when the device 110 is cold from a contact 34. Also connected in series with the motor 20 is the cutout switch 36 having a blade 38 biased by a spring (not shown) into engagement with a stationary contact 40. The coil 44 is series connected between the cutout switch 36 and the motor, so that opening of said switch will cut out the low resistance path to the motor.

The coil 44 has a movable armature 46 which, instead of as heretofore being physically connected to the blade 38, is connected to an electrically conductive arm 112. The arm carries a contact 114. When the current flowing through the coil 44 is below a value (in excess of rated starting current but below locked rotor current) sufficient to pull in the armature 46 against a return (biasing) spring (not shown), the arm 112 maintains the contact 114 spaced from and poised above the tip of the blade 38. Hence, as soon as the current flowing through the coil 44 reaches a predetermined value between rated starting current for the motor and locked rotor current for said motor, said coil, through the armature 46, will pull down the arm 112, causing the contact 114 to engage the blade 38. As it does so, it moves the blade 38 away from the motor cutout contact 40, thereby opening the low resistance energizing circuit for the motor 20. It will be apparent that the surge limiter functions in the manner already described in detail and that the electromagnetic locked rotor current sensing and cutout means 14 operates to open the low resistance energizing circuit for the motor when the current supplied thereto is a predetermined amount higher than the rated starting current for said motor. In this respect, therefore, the device 110 is essentially similar to the devices 10, 66, 72, 84 and 94.

The holding means 16 of said device 110 which constitutes the coil 48 that actuates the same armature 46 as the coil 44 is energized through a circuit that is open before the contact 114 touches the blade 38. This circuit includes a resetting switch 116 composed of a stationary yielding contact 118 and a movable contact 120. The movable contact 120 is actuated by the bimetallic strip 30. This is done by a spacer block 122 of insulating material which, through a link 124, connects the tip of the bimetallic strip 30 to the movable contact 120. The moveable contact 120 is spaced from the stationary yielding contact 118 when the device 110 is in its cold (idle) posture at which time the contacts 32, 34 likewise are spaced apart. However, the spacing between the contacts 118, 120 is considerably less than that between the contacts 32, 34 and is so arranged that within a comparatively short period of time after the control switch 24 is closed so as to activate the device 110, the contacts 118, 120 will close. It will be recalled that a preferred design for the strip 30 and the contacts 32, 34 is such that the contacts 32, 34 close after the motor 20 has started, for example, 10 to 15 seconds after the switch 24 is closed, providing, of course, that the rotor is not locked. But the contacts 118, 120 will close in the preferred form of my invention about 0.2 second after the switch 24 is closed. This fast closure is desirable because the contacts 118, 120 are in the energizing circuit for the holding coil 48 and this energizing circuit should be readied preparatory to energization thereof upon closure of the switch 24 in order that the cutout switch 36 may be locked in its actuated condition once it is energized.

It is believed that the operation of the resetting means 18 now is clear, but it will be briefly described for the purpose of completeness. Assume that after a period of operation of the motor 20 the switch 24 is opened and then shortly thereafter reclosed, so that the device is in its running posture, and that the motor 20 is in locked rotor condition, for example, because of a compressor back pressure build up. The thermistor 26 still is its low resistance state and contacts 32, 34 are closed. The blade 38 is closed against the contact 40 and the contact 114 is spaced from the blade 38. The contacts 118, 120 also are closed because the strip 30 is warm. A locked rotor current will flow through the switch 36 and the coil 44 and will pull in the arm 112 to open the switch 36 and cut out the motor. At the same time that the switch 36 is opened, the contact 114 engages the blade 38 to complete the previously open energizing circuit for the holding coil 48 through the previously closed resetting contacts 118, 120. Because the resistance value of the coil 48 is high, a low order of current, for example, about 0.15 ampere, flows through the motor and the surge limiter 12 and permits the surge limiter to cool off. The design is such that in approximately two minutes or at some other suitable predetermined period the contact 120 will be moved away from the contact 118 to open the energizing circuit for the holding coil 48. This recycles the device 110 since the armature 46 now is released, permitting the blade 38 to reclose against the contact 40 so as to reclose the motor energizing circuit.

The device 110 will function with equal facility if the switch 24 is closed with the motor in locked rotor condition (e.g., because of a utility failure) while said device 110 is in its cold posture. At this time the contacts 118, 120 are spaced apart as are the contacts 32, 34. However, the thermistor 26 is in its high resistance state. Because the motor will not start, a locked rotor current will continue to flow through the surge limiter and the motor beyond the time when the motor should have started, in the preferred form of my invention, beyond 0.7 second. At this moment the resistance value of the thermistor 26 has reduced sufficiently to permit the rated starting current to flow through the motor. However, as the resistance value of the thermistor continues to drop, the pull-in point for the sensing coil 44 will be reached. Before this occurs (at about 0.2 second) the bimetallic strip 30 will have flexed sufficiently to close the contacts 118, 120. When the armature 46 is pulled in by the coil 44 the contact 114 will engage the blade 38 to shift it away from the contact 40 so as to cut out the low resistance energizing path for the motor. At the same time the energizing circuit for the coil 48 will be completed.

Thus, regardless of whether the device 110 is in its cold or its running posture, the occurrence of a locked rotor condition will cut out the motor and keep it cut out without imposing a locked rotor current on the motor or the power line for more than a small fraction of a second. It will be observed that the energizing circuit for the holding coil 48 is open when the sensing coil is energized to its actuation state in both idle and running postures of the device 110, so that the same magnetic flux conditions are present each time that the coil 44 is energized to a state sufficient to pull in the armature 46. Thus, identical repetitive cutout operations will be performed in idle and running postures of the device 110.

A mechanical link 126 connects the tip of the bimetallic strip 30 to the arm 112. Said link normally is disengaged from the strip 30 or includes a lost motion element so as not to interfere with the action of the arm 112 when the armature 46 is pulled in by the coil 44. This disengagement is maintained in the deflected, i.e., flexed, condition of the bimetallic strip 30 when a rated running current for the motor is passing through said strip and through the resistor 28 which heats the strip. However, when a current in excess of rated running current for the motor, but less than the pull-in current for the coil 44, passes through the resistor 28 and the strip 30 for a predetermined period of time which is arranged to vary between about 10 to 30 seconds, the strip 30 will flex an additional amount sufficient to engage the mechanical link 126 and through it force the arm 112 toward the blade 38 far enough to cause the contact 114 to engage said blade 38 and depress it sufficiently to disengage it from the motor cut-out contact 40. Thereupon, due to an overload on the motor, the low resistance motor energizing circuit will be opened. Opening of the low resistance motor energizing circuit in the foregoing fashion will cause the holding coil 48 to be rendered effective and the motor will remain cut out until recycled by automatic actuation of the resetting means 18.

It thus will be seen that I have provided motor starting devices which achieve the several objects of my invention and which are well adapted to meet the condition of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. A starting device for an electric motor operating a refrigerator compressor and having a rated starting current and a higher locked rotor current at starting, said device comprising:
 (a) a surge limiter adapted to be series connected between the motor and a power line and having a current limiting starting resistance value and means to reduce said starting resistance value to a low running value so as to provide a low resistance path to the motor after a period of time sufficient to start the motor with its rotor unlocked,
 (b) a locked rotor current sensing and motor cutout means including a low resistance electromagnetic coil and a normally closed cutout switch directly actuatable by said coil, said coil and motor switch being connected in series with the surge limiter, said coil having a cut-in point to immediately open the switch upon the attainment during an attempted start with said starting resistance at a low running value of a current level between the rated starting current for the motor and the locked rotor current so as to render said low resistance path to the motor ineffective,
 (c) a holding means to maintain the cutout switch open as soon as it has been opened by the electromagnetic coil, and
 (d) a resetting means to render the holding means ineffective subsequent to opening of the switch.

2. A device as set forth in claim 1 wherein the holding means is a second electromagnetic coil having a normally open energizing circuit in series with the surge limited and first rendered effective upon opening of the normally closed cutout switch.

3. A device as set forth in claim 2 wherein the second electromagnetic coil is effective upon energization thereof to hold the normally closed cutout switch open.

4. A device as set forth in claim 1 wherein the means in the surge limiter to reduce the starting resistance value to a low running value is a current sensitive thermally responsive member and wherein a mechanical linkage extends from said member to the normally closed cutout switch to open said cutout switch upon a temporally extended passage of a current through the surge limiter in excess of the full load current for the motor and less than the cut-in current for the low resistance electromagnetic coil.

5. A device as set forth in claim 2 wherein the resetting means is a resistor in series with the second electromagnetic coil which resistor has a positive temperature coefficient of resistance.

6. A starting device for an electric motor operating a refrigerator compressor and having a rated starting current and a higher locked rotor current at starting, said device comprising:
 (a) a surge limiter adapted to be series connected between the motor and a power line and having a resistor with a negative temperature coefficient and a low resistance shunt path for said resistor, said shunt path including a bimetallic strip and a pair of normally open contacts that are closed upon heating of said strip, said strip being in heat conductive relationship with the resistor;
(b) a locked rotor current sensing and motor cutout means including a low resistance electromagnetic coil and a normally closed cutout switch directly actuable by said coil, said coil and motor switch being connected in series with the surge limiter, said coil having a cut-in point to immediately open the switch upon the attainment during an attempted start with said low resistance path closed of a current level between the rated starting current for the motor and the locked rotor current;
(c) an electromagnetic holding means to maintain the cutout switch open as soon as it has been opened by the electromagnetic coil, said holding means including an energizing circuit which has a pair of normally open contacts series connected therein and closed upon actuation of the low resistance electromagnetic coil; and
(d) a resetting means comprising a pair of normally open contacts series connected in the energizing circuit for the holding means which contacts are closed by the bimetallic strip upon the heating thereof and are opened by said strip when the strip cools off following opening of the cutout switch.

7. A starting device as set forth in claim 6 wherein a mechanical linkage extends from the bimetallic strip to the normally closed cutout switch to open said cutout switch upon a temporally extended passage of current through the surge limiter in excess of the full load current for the motor and less than the cutin current for the low resistance electromagnetic coil.

References Cited

UNITED STATES PATENTS

| | | | |
|---|---|---|---|
| 2,468,609 | 4/1949 | Whitehouse | 313—430 X |
| 3,017,564 | 1/1962 | Barney | 323—9 |
| 3,064,162 | 11/1962 | Savell | 318—430 X |
| 3,112,435 | 11/1963 | Barney | 317—41 X |
| 3,200,274 | 8/1965 | Munier | 317—13 X |

ORIS L. RADER, *Primary Examiner.*

G. SIMMONS, *Assistant Examiner.*